United States Patent [19]

Shuert

[11] Patent Number: 4,976,092

[45] Date of Patent: Dec. 11, 1990

[54] METHOD AND APPARATUS FOR TRANSPORTING SHEET METAL STAMPING

[76] Inventor: Lyle H. Shuert, 1034 Stratford Pl., Bloomfield Hills, Mich. 48013

[21] Appl. No.: 367,867

[22] Filed: Jun. 19, 1989

[51] Int. Cl.[5] ........................... B65B 5/10; B62B 1/08

[52] U.S. Cl. .................................... 53/475; 108/55.1; 206/449; 211/41; 211/169.1; 312/193

[58] Field of Search ................. 53/475, 246, 263, 249, 53/539; 414/799, 331, 798.2; 108/55.1; 206/449, 454; 312/183, 187, 193; 211/41, 45, 47, 40, 59.4, 126, 164, 169.1

[56] References Cited

U.S. PATENT DOCUMENTS

| | | | |
|---|---|---|---|
| Re. 27,462 | 8/1972 | Gutierrez | 211/169.1 X |
| 1,285,793 | 11/1918 | Reeves | 312/193 |
| 2,718,342 | 9/1955 | Anderson | 53/246 |
| 2,942,392 | 6/1960 | McCain et al. | 53/246 |
| 3,235,093 | 2/1966 | Eisbart et al. | 211/47 |
| 3,282,438 | 11/1966 | Frechette | 211/59.4 |
| 3,393,495 | 7/1968 | Hillman et al. | 53/246 |
| 3,500,612 | 3/1970 | Hall | 53/246 |
| 3,613,911 | 10/1971 | Walchhuter | 53/246 X |
| 3,702,676 | 11/1972 | Stephens et al. | 108/55.1 X |
| 4,033,597 | 7/1977 | Boyer | 211/41 X |
| 4,231,175 | 11/1980 | Baxter | 312/187 X |
| 4,580,679 | 4/1986 | Hellman, III | 206/449 X |
| 4,721,427 | 1/1988 | Sanders et al. | 211/41 X |
| 4,756,581 | 7/1988 | Phillips | 312/183 |

*Primary Examiner*—Horace M. Culver
*Attorney, Agent, or Firm*—Krass & Young

[57] ABSTRACT

A method and apparatus for handling sheet metal stampings utilizing a tack including a base structure defining a floor surface, upstanding end structures, and forklift openings to facilitate transport of the rack. A plurality of leaves are positioned in spaced relation along the floor surface with each leaf including a hinge along its lower edge defining a hinge axis extending normal to the longitudinal axis of the rack. The leaf nearest one of the end structures is spaced from that end structure to allow that leaf to assume a pivoted position on one side of a reference plane in which the upper end of the leaf is supported by the one end structure and the leaf nearest the other end structure is spaced from that end structure to allow that leaf to assume a pivoted position on the other side of its reference plane in which the leaf is supported by the other end structure. With all but the endmost leaf pivoted to one side of the respective reference planes, a stamping is placed against the endmost leaf and the next adjacent leaf is pivoted to a position in overlying relation to the first leaf to sandwich the stamping therebetween, whereafter the next stamping is positioned against the second leaf, the third leaf is pivoted to a position to sandwich the second stamping between the second and third leaves and the process is repeated until all of the leaves have been pivoted with a stamping positioned between each successive set of leaves.

18 Claims, 3 Drawing Sheets

METHOD AND APPARATUS FOR TRANSPORTING SHEET METAL STAMPING

BACKGROUND OF THE INVENTION

This invention relates to methods and apparatus for handling and transporting sheet metal stampings and more particularly to methods and apparatus specially suitable for handling sheet metal stampings utilized in the fabrication of motor vehicle bodies.

Modern day motor vehicle bodies comprise a base or skeletal structure, commonly called a body-in-white, to which a series of sheet metal stampings are suitably attached to form the final exterior configuration of the vehicle body. These stampings include, for example, hoods, deck lids, roof panels, quarter panels and door panels. These stampings are produced by stamping facilities in mass quantities and it is necessary to receive the stampings emerging from the stamping facilities and transport them to the site of the vehicle body assembly. During such transport, it is imperative that the stamping be protected from both surface or cosmetic damage as well as from stresses such as might produce structural damage to the stampings. It is also imperative that the transport of the stampings from the stamping facility to the body fabrication site be done in a minimum of time and with a minimum of labor so as to minimize the ultimate cost of the vehicle. Various methods and apparatus are currently in use to transport sheet metal stampings within and between automotive facilities. For example, various forms of racks and containers are currently used in which the stampings are placed, utilizing suitable customized dunnage to protect the panels from damage during transport. However, these prior art racks and containers utilizing customized dunnage require that the dunnage be individually prepared for each use of the rack and container, require relatively complicated maneuvers to ensure that the stampings are suitably positioned within the rack or container in association with the dunnage, require relatively complicated maneuvers to ensure that the stampings are removed from the container or rack without damage, and require frequent replacement of the dunnage since the dunnage is frequently damaged or destroyed in the process of the loading, transporting, or unloading operations.

SUMMARY OF THE INVENTION

This invention is directed to the provision of an improved method and apparatus for handling and transporting sheet metal stampings.

More particularly, this invention is directed to the provision of an improved method and apparatus for handling sheet metal stampings employed in the fabrication of motor vehicle bodies.

According to the invention methodology, a rack structure is provided; a plurality of leaves are positioned in serial relation along a surface of the rack structure with each leaf hinged at one edge thereof to the rack surface in generally parallel spaced relation to the hinge axes of the adjacent leaves and with each leaf pivotally movable between angularly spaced first and second positions; the rack structure is positioned proximate a source of planar members such for example as sheet metal stampings, the leaves are pivoted to their first positions; one of the leaves is pivoted to its second position; a planar member is placed on the one leaf; the next adjacent leaf is pivoted to its second position to sandwich the planar member between the one leaf and the adjacent leaf; these steps are repeated until a plurality of the planar members are positioned interstitially in sandwich fashion between successive pairs of leaves; and the rack, with the planar members interspersed between the leaves, is transported to a location remote from the source such for example, as a vehicle body fabrication site. This methodology provides a convenient, inexpensive, and rapid means of transporting the planar members between the source site and an ultimate usage site without damage to the planar members.

According to a further feature of the invention methodology, for each leaf, the first position in on one side of a plane generally normal to the rack surface and passing through the hinge axis of the leaf and the second position is on the other side of the plane. This arrangement allows the leaves to be maintained by gravity in each of their pivoted positions.

According to a further aspect of the invention methodology, the leaves comprise molded plastic members. This arrangement allows sheet metal stampings to be transported according to the invention methodology without damage to the surface of the sheet metal stampings.

According to another feature of the invention methodology, the rack includes end structures at either end of the rack surface and the leaves are supported in their position on one side of the reference planes by one of the end structures and are supported in their position on the other side of the reference planes by the other end structure. This arrangement allows the leaves, when pivoted to one side of their reference planes, to be supported by one end structure and allows the leaves, when pivoted to the other side of their reference planes, to be supported by the other end structure.

According to a further feature of the invention methodology, each of the leaves includes a main body portion having a size and shape conforming to the size and shape of the planar members to be transported, and edge portions on either side of the main body portion including internestable means, and the internestable means on the edge portion of adjacent leaves internest with the leaves in their reference planes and stack with the leaves in either of their first or second positions. This arrangement allows the adjacent leaves to move apart in their working positions to provide a protective envelope or cocoon for each of the planar members interspersed between the adjacent leaves.

In the specific disclosed application of the invention methodology, the rack structure is positioned proximate a stamping facility, the stampings emerging from the stamping facility are successively positioned in interspersed relation to successive leaves, and the rack, following the loading operation, is transported by a forklift truck to either a storage facility or a usage facility.

The invention apparatus comprises a rack including spaced end structures and means to facilitate transport of the rack between spaced locations; a plurality of leaves positioned in spaced relation along a surface of the rack extending between the end structures with each leaf hinged at one edge thereof to the surface in generally parallel spaced relation to the hinge axis of the adjacent leaves and with each of the leaves being pivotal between a first position on one side of a plane passing through the hinge axis of the leaf to a second position on the other side of the plane so that one of the leaves may be pivoted from its first to its second position, one of the planar members may be positioned against the one leaf, and the next adjacent leaf may be pivoted from its first to its second position to protectively sandwich the one planar member between the one leaf and the adjacent leaf.

According to a further aspect of the invention rack structure, the leaves are positioned in spaced relation along the surface of the rack substantially from end structure to end structure and the reference plane for each leaf is substantially normal to the surface of the rack structure so that the leaf nearest one end structure is supported by that end structure with that leaf pivoted to its first position and the leaf nearest the other end structure is supported by that end structure with that leaf pivoted to its second position. This arrangement provides a means whereby the end structures of the rack respectively support the leaves with the leaves pivoted respectively to either their first or second positions.

According to a further aspect of the invention apparatus, the rack surface comprises a floor surface of the rack; the end structures extend vertically upwardly at opposite ends of the floor structure; and the leaves are pivoted at their lower edges to the floor surface.

According to a further aspect of the invention apparatus, each of the leaves includes a main body generally planar portion having a size and configuration conforming to the size and configuration of the planar members and edge portions along opposite sides of the main body portion, the edge portions include internestable structure, and the internestable structures on the edge portions of adjacent leaves are operative to internest with the leaves in their reference planes and are operative to stack with the leaves in either of their first or second positions.

According to a further aspect of the invention apparatus, each edge portion defines a plurality of spaced male configurations on one side of the leaf and a corresponding plurality of spaced female configurations on the other side of the leaf.

According to a further aspect of the invention apparatus, each leaf is formed of a plastic material and includes a main body portion and a live hinge along one edge of the main body portion formed integrally with the main body portion.

DETAILED DESCRIPTION OF THE PREFERRED EMBODIMENT

Figure 1:
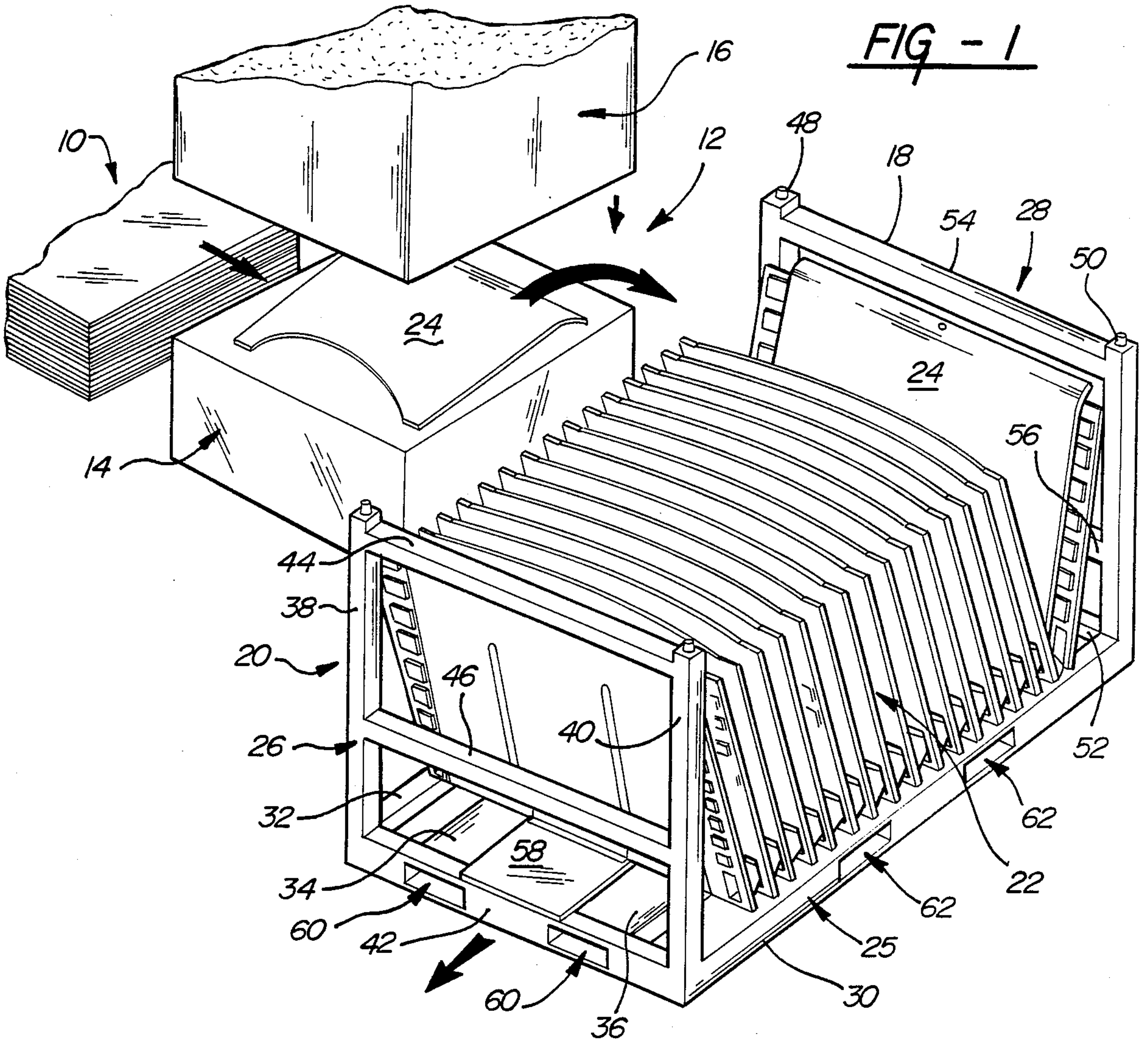
FIG. 1 is a perspective somewhat schematic view showing the invention methodology.
Figure 2:
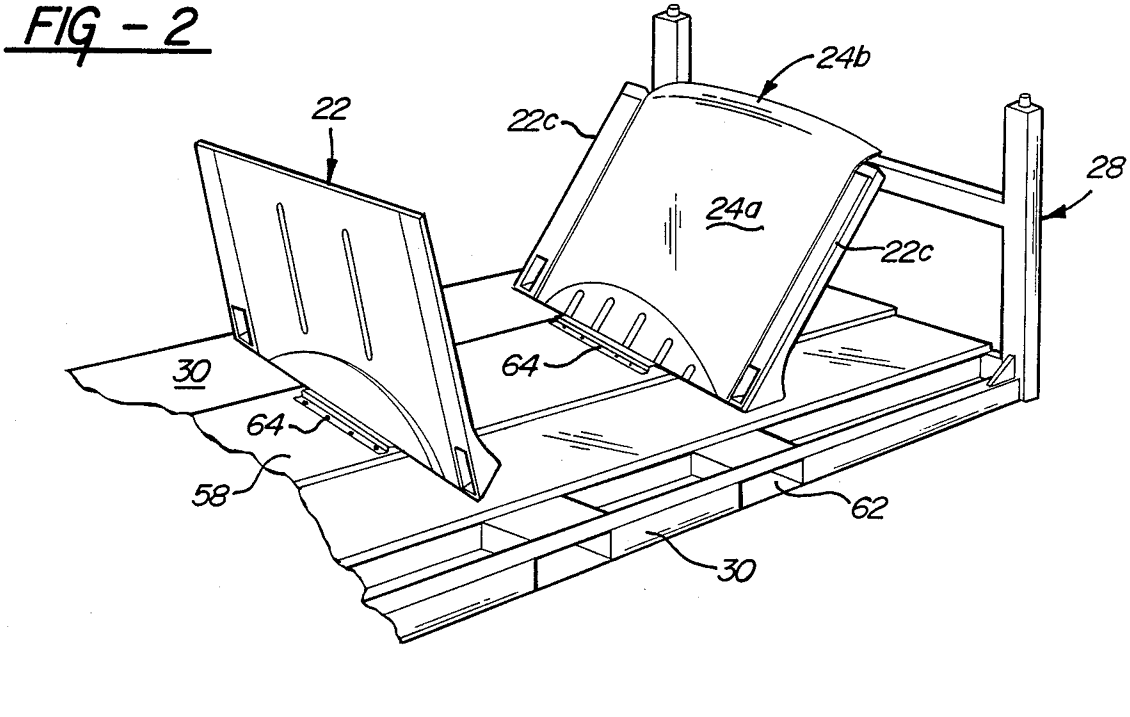
FIG. 2 is a perspective somewhat schematic view of a rack assembly employed in the invention methodology.
Figure 5:
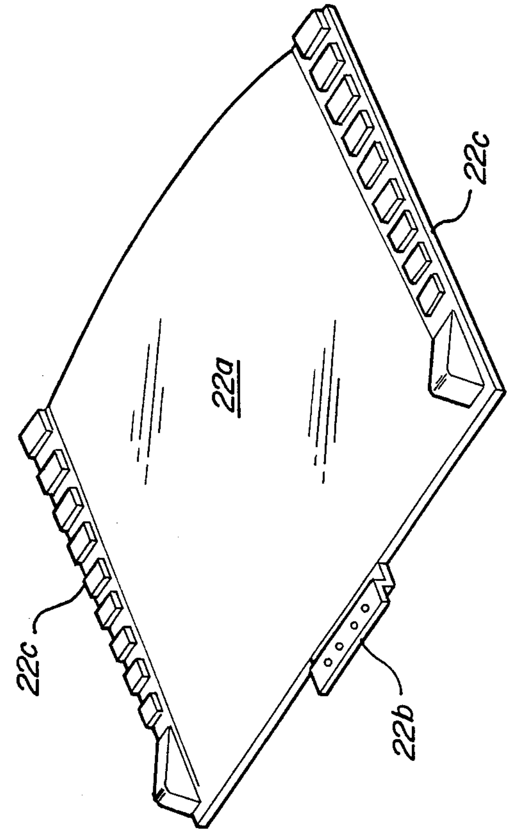
FIGS. 3, 4, 5, and 6 are detailed views showing various aspects of leaves employed in the rack assembly.
Figure 4:
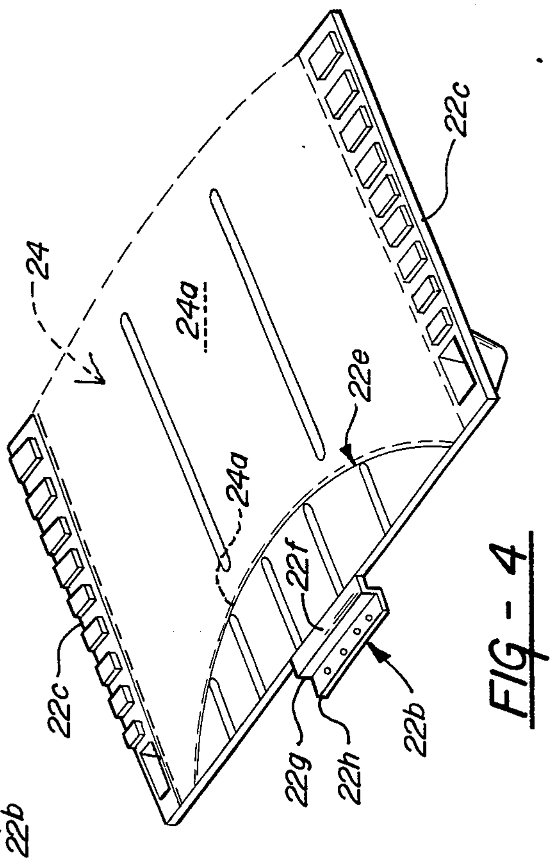
Figure 3:
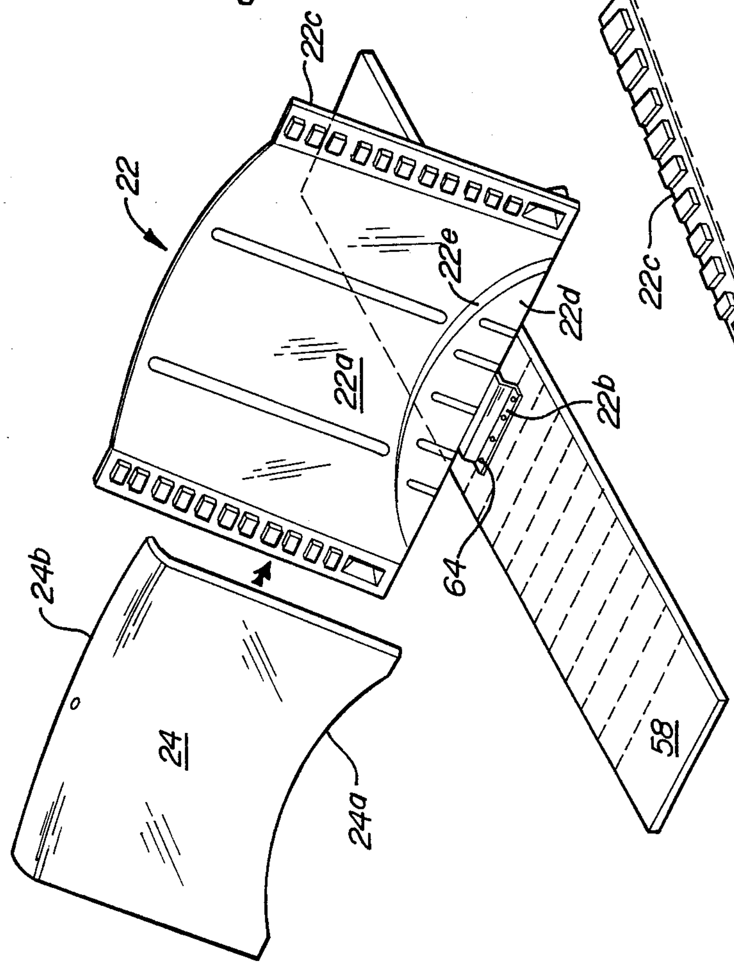

The invention methodology is illustrated schematically in FIG. 1 which discloses a stack of flat sheet metal sheets 10, a stamping press 12 comprising a fixed lower platen 14 and a movable upper platen 16, and a rack assembly 18 including a rack 20 and a plurality of leaves 22.

Broadly considered, the invention methodology comprises taking each stamped item 24 as it emerges from the stamping press, placing it against one leaf 22, and thereafter pivoting the next adjacent leaf into an overlying position relative to the stamping 24 so as to protectively sandwich the stamping between the two adjacent leaves with the process being repeated for each successive stamping until all of the leaves have been utilized, whereafter the rack is transported to a suitable storage or assembly site.

Rack 20 is formed of tubular steel members and includes a floor structure 25 and end structures 26 and 28 at opposite ends of the floor structure.

Floor structure 25 may take various forms and may, as shown, comprise longitudinal side rails 30 and 32 and central or intermediate longitudinal rails 34 and 36.

End structure 26 may comprise, for example, posts 38 and 40, a bottom transverse rail 42, a top rail 44, and an intermediate rail 46.

Similarly, end structure 28 may comprise posts 48 and 50, a bottom rail 52, a top rail 54, and an intermediate rail 56.

A board 58, formed of plywood or the like, is secured to the upper face of longitudinal floor rails 34 and 36 and extends from the bottom rail 42 of end structure 26 to the bottom rail 52 of end structure 28.

Longitudinally extending forklift openings or tunnels 60 are formed in the end structures of the rack and transversely extending forklift openings or tunnels 62 are formed in the side rails of the floor structure of the rack so that the rack may be readily hoisted from either side of the rack, or from either end of the rack, by the insertion of the forks of a forklift truck in the respective openings or tunnels 60,62 to transport the rack assembly to a site removed from the stamping site following loading of the stampings 24 into the rack assembly.

Each leaf 22 is identical and each is formed of a suitable molded plastic material. It will be understood that the specific shape and configuration of the leaves will vary depending upon the specific stamping being handled. The leaf described herein is specifically shaped and configured to accommodate a deck lid panel stamping 24 but it will be apparent that the leaves may be readily customized to accommodate any other planar stamping such for example as quarter panels, roof panels, hoods, and door panels.

Each leaf includes a main body portion **22*a*, a hinge 22*b* positioned along the lower edge of the main body portion, and vertical edge portions 22*c* at opposite sides of main body portion 22*a***.

Main body portion **22*a* has a slightly concavo-convex configuration to match the similar concavo-convex configuration of the deck lid, and includes means defining an arcuate shoulder or edge 22*e* conforming to the cut-out 24*a* at the forward edge of the deck lid. When positioned on a leaf 22, the concavo-convex main body portion of the deck lid is seated on the concavo-convex main body portion of the leaf, the arcuate cut-out 24*a* is seated on arcuate shoulder 22*e*, and the rear angled portion 24*b* of the deck lid projects upwardly and rearwardly with respect to the top of the leaf 22**.

Hinge **22*b* is a live hinge and is formed of plastic material and comprises an integral portion of the leaf. Hinge 22*b* includes a first portion 22*f* formed integrally with the lower edge 22*d* of the leaf, a second portion 22*g* extending at right angles to portion 22*f*, and a third portion 22*h* extending at right angles to portion 22*g* and adapted to be secured by suitable fasteners 64** to plywood member 58 in a manner to define a hinge axis for the panel extending transversely to the longitudinal axis of the rack.

Figure 6:
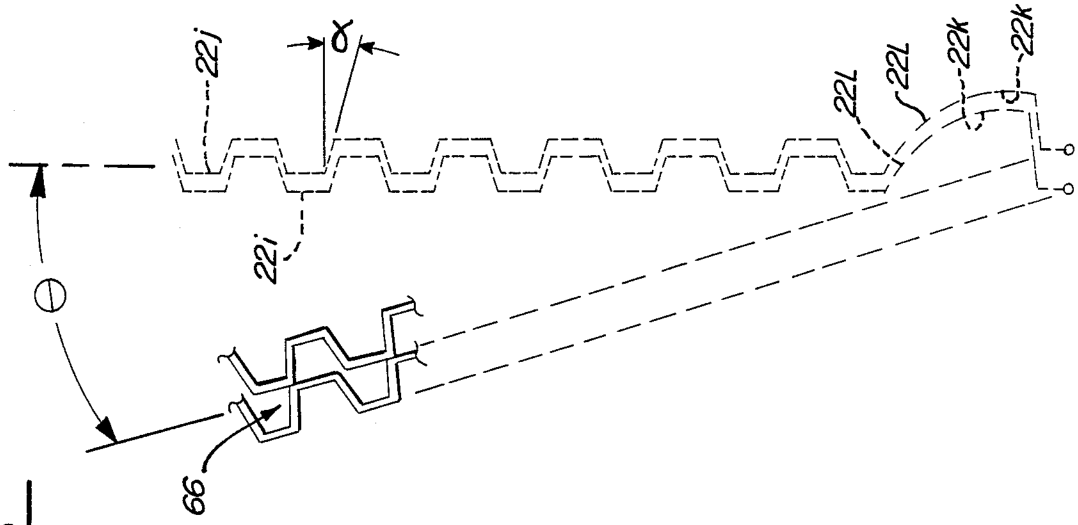

Edge portions 22c operate to define protected chambers or cocoons for the sheet metal stampings 24. Specifically, each edge portion defines a plurality of vertically spaced male configurations 22i on one side of the edge portion and a corresponding plurality of vertically spaced female configurations 22j on the other side of the edge portion so that, as best seen in dash lines in FIG. 6, when two leaves are juxtaposed with the leaves in a vertical disposition, the male configurations on the edge portion of one leaf assume a nesting relationship with the female configurations on the adjacent leave but, as seen in solid lines in FIG. 6, when the two leaves are juxtaposed with the leaves in a position pivoted to either side of vertical, the leaves move out of their nested relative disposition and assume a stacked relative disposition so that the leaves define a cocoon or space 66 therebetween to comfortably and protectively accommodate a deck lid 24. Each edge portion further includes an enlarged pocket 22k at the lower end of the edge portion for nesting receipt of the enlarged male configuration 221 defined at the opposite face of each pocket 22k whereby to facilitate the stability of the stacked leaves.

The leaves are mounted on the plywood boards 58 in serial equally spaced relation with the hinge axis of each leaf in generally parallel spaced relation to the hinge axes of the adjacent leaves. The leaves are provided in parallel spaced relation along substantially the entire longitudinal surface of board 58 with the hinge axis of the leftmost leaf, as viewed in FIG. 7, positioned proximate to but spaced from end structure 26 and the hinge axis of the rightmost leaf, as viewed in FIG. 7, positioned proximate to but spaced from end structure 28. As best seen in FIG. 8, each leaf, in its assembled configuration on the rack assembly, is able to move between a first position on one side of a vertical reference plane 70 extending normal to the floor structure of the rack and passing through the hinge axis of the leaf to a second position on the other side of the vertical reference plane 70. For example, the leaves may assume an angle 8 of 20 degrees from the vertical in either their first or second positions. The draft angles o of the male and female configurations on the edge portions of the leaves may be, for example, 8 degrees.

Figure 7:
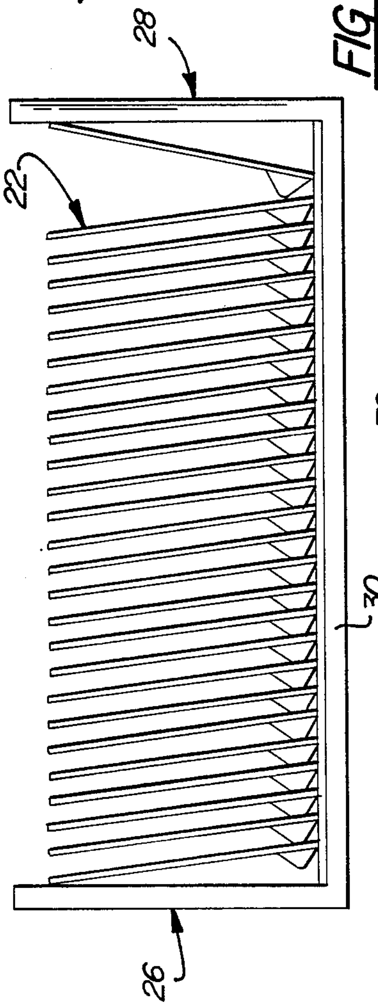
FIGS. 7, 8, and 9 are side elevational views of the invention rack assembly showing various stages in the practice of the invention methodology.
Figure 8:
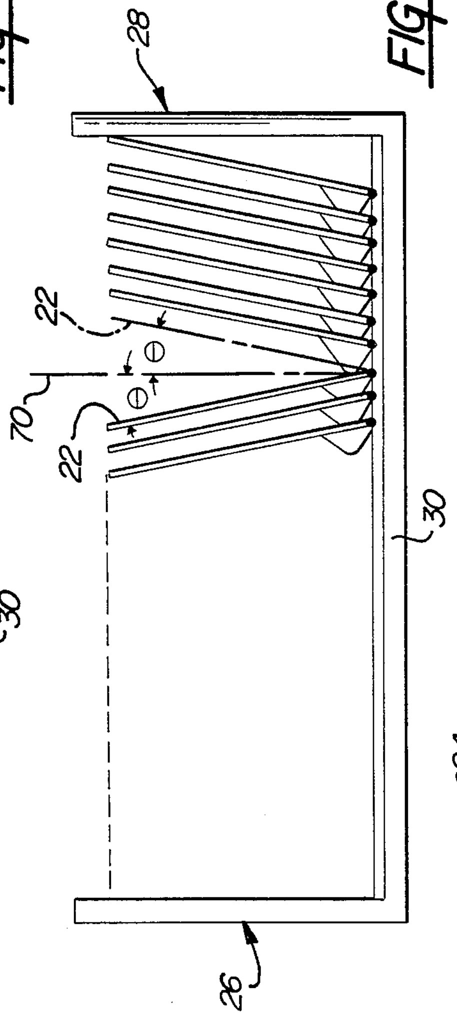

In the use of the invention rack assembly to practice the invention methodology, the leaves 22, with the exception of the rightmost leaf as seen in FIG. 7, are moved to their positions on one side of the respective reference planes passing through the respective hinge axes with the stacked leaves, as thus positioned, being supported by the end structure 26 and the single rightmost leaf being supported by end structure 28. A deck lid panel 24 emanating from press 14 is now positioned against the rightmost leaf 22 as viewed in FIG. 7 with the main body portion of the panel positioned against the concavo-convex main body portion of the leaf, the lower concave edge 24a of the panel seated on shoulder 22e, the side edges of the panel positioned between the edge portions 22c of the leaf, and the rear angled portion 24b of the panel extending upwardly above the top edge of the leaf and to the right of the leaf as viewed in FIG. 7. The next adjacent leaf 22 is now pivoted from its position on one side of its reference plane to its position on the other side of its reference plane to bring the leaf into a position in stacked, overlying relation to the exposed surface of the deck panel 24 so as to sandwich the deck panel 24 between the first and second leaves with the deck panel being protectively positioned in the cocoon 66 defined between the adjacent leaves by the stacked engagement of the edge portions of the adjacent leaves. Configurations 22i, 22j are dimensioned such that the width of the space 66 defined between adjacent leaves with the leaves in their stacked disposition is greater than the thickness of a deck panel 24 so that the panel is loosely but protectively received in the space and so that the panels 24 are never placed in a load bearing situation and are therefore never vulnerable to cosmetic or structural damage.

Figure 9:
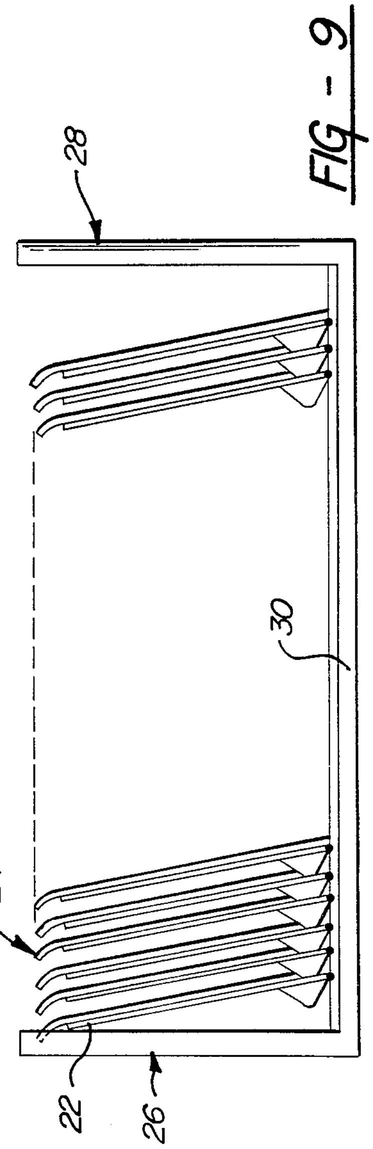

The next deck lid panel 24 is now positioned against the exposed face of the second leaf 22 whereafter the third leaf 22 is moved from its position on one side of its reference plane to its position on the other side of its reference plane to sandwich the second deck lid panel between the second and third leaves. This process is thereafter repeated for each successive deck lid until all of the leaves, as seen in FIG. 9, have been utilized with a deck lid positioned between each successive pair of leaves and with all of the leaves now moved into their position on the other side of their reference planes and with all of the leaves supported directly or indirectly by the end structure 28. The rack assembly with the deck lids interspersed between successive pairs of leaves is now transported, by the insertion of the forks of a forklift truck either into forklift tunnels 60 or forklift tunnels 62, to either a storage location or to a vehicle body assembly location. Preferably, some manner of banding or chocking (not shown) is employed to avoid inadvertent shifting of the leaves and interspersed deck lids during the transfer of the rack assembly.

It will be appreciated that, upon arrival at the rack assembly at the site of usage, for example a vehicle body fabrication site, the panels may be readily and quickly removed from the rack structure for utilization on each successive vehicle body simply by reversing the procedure seen in FIGS. 7-9. That is, the first leaf as viewed in FIG. 9 is pivoted to the other side of its reference plane to expose the first deck lid, the first deck lid is removed for utilization on a vehicle body, the second leaf is pivoted to the other side of its reference plane, the second deck lid is removed, etc., until all of the deck lids have been unloaded from the rack assembly for utilization in the fabrication of successive vehicle bodies, whereafter the rack assembly is returned by a forklift truck to the stamping site to again undergo the loading operation as seen in FIGS. 7-9.

In a typical application, rack floor structure 24 may have a length of 108 inches and a width of 65 inches; posts 38, 40, 48, 50 may have a height of 60 inches; leaves 22 may have a width of 63 inches and a height of 54 inches and may be formed of 0.125 inch polyethylene material; the hinges axes of adjacent leaves may be spaced by 3 inches; and the hinge axes of the leftmost and rightmost leaves may be spaced from the respective rack end structure 26, 28 by 15 inches.

The invention apparatus and methodology provides an efficient and inexpensive means of transporting sheet metal stampings between a stamping site and either a storage or usage site and, specifically, provides a transport system in which loading time is minimized, the stampings are superbly protected during transport and storage, and unloading time is minimized. The invention apparatus and methodology also totally eliminate the need to provide individually customized dunnage for the rack or container for each loading operation and eliminate the need to replace damaged or destroyed dunnage. By reducing surface and structural damage to the stampings, reducing the loading and unloading time, and eliminating the need to replace dunnage, the invention apparatus and methodology substantially reduce the expense of delivering unmarred stampings to the assembly site and thereby significantly reduce the final cost of the vehicle.

Whereas a preferred embodiment of the invention has been illustrated and described in detail, it will be apparent that various changes may be made in the disclosed embodiment without departing from the scope or spirit of the invention.

What is claimed is:

1. A method of handling and transporting planar members comprising the steps of:

providing a rack structure;

positioning a plurality of leaves in serial relation along a surface of said rack structure with each leaf hinged at one edge thereof to said surface in generally parallel spaced relation to the hinge axes of the adjacent leaves and with each leaf pivotally movable between angularly spaced first and second positions;

positioning said rack structure proximate a source of said planar members;

pivoting said leaves to their first positions;

pivoting one of said leaves to its second position;

placing a planar member adjacent said one leaf;

pivoting the next adjacent leaf to its second position while providing a space between said one leaf and said adjacent leaf greater than the thickness of said planar member so as to protectively position said planar member between said one leaf and said adjacent leaf;

repeating steps E, F and G until a plurality of said planar members are positioned in sandwich, interspersed fashion between successive pairs of leaves; and transporting said rack, with said planar members interspersed between said leaves, to a location remote from said source.

2. A method according to claim 1 wherein, for each leaf, said first position is on one side of a plane generally normal to said rack surface and passing through the hinge axis of that leaf and said second position is on the other side of said plane.

3. A method according to claim 2 wherein said rack includes end structures at either end of said surface and said leaves are supported in said position on one side of said plane by one of said end structures and are supported in said position on the other side of said plane by the other end structure.

4. A method according to claim 1 wherein said planar members comprise sheet metal stampings and said leaves comprise molded plastic members.

5. A method according to claim 1 wherein said method includes the further step of providing each of said leaves with a main body portion having a size and shape conforming to the size and shape of said planar members and edge portions on either side of said main body portion including internestable means and said space providing step is accomplished by allowing the internestable means on the edge portions of adjacent leaves to move into a stacked relative disposition as the leaves assume their second positions.

6. A method according to claim 1 wherein each of said leaves includes a main body portion having a size and shape conforming to the size and shape of said planar members and edge portions on either side of said main body portion including internestable means and the internestable means on the edge portions of adjacent leaves internest with the leaves in an intermediate angular position between said first and second positions and move into a stacked relative disposition as the leaves move away from said intermediate angular positions to provide said space between adjacent leaves.

7. A method of loading sheet metal stampings emerging from a stamping facility, said method comprising:

providing a rack structure;

positioning a plurality of leaves in serial relation along a surface of said rack structure with each leaf hinged at one edge thereof to said surface in generally parallel spaced relation to the hinge axes of the adjacent leaves and with each leaf movable between a first position on one side of a plane generally normal to said surface and passing through the hinge axis of the leaf to a second position on the other side of said plane;

positioning said rack structure adjacent said stamping facility;

pivoting said leaves to their first positions;

pivoting one of said leaves to its second position;

placing a sheet metal stamping adjacent said one leaf;

pivoting the next adjacent leaf to its second position while providing a space between said one leaf and said adjacent leaf greater than the thickness of said stamping so as to protectively position said stamping between said one leaf and said adjacent leaf;

repeating steps E, F and G until a plurality of said stampings are positioned in sandwich in the interspersed fashion between successive pairs of leaves; and transporting said rack, with said stampings interspersed between said leaves, to a location remote from said stamping facilities.

8. A method according to claim 7 wherein said method includes the further step of providing each of said leaves with a main body portion having a size and shape conforming to the size and shape of said stampings and edge portions on either side of said main body portion including internestable means and said space providing step is accomplished by allowing the internestable means on the edge portions of adjacent leaves to move into a stacked relative disposition as the leaves assume their second position.

9. An apparatus for handling and transporting planar members, said apparatus comprising:

a rack including spaced end structure and means to facilitate transport of said rack between spaced locations;

a plurality of leaves positioned in serial relation along a surface of said rack extending between said end structures with each leaf hinged at one edge thereof to said surface in generally parallel spaced relation to the hinge axes of the adjacent leaves and with each leaf pivotal between a first position on one side of a reference plane passing through the hinge axis of that leaf and a second position on the other side of said plane so that one of said leaves may be pivoted from its first to its second position, one of said planar members maybe positioned adjacent said one leaf, and the next adjacent leaf may be pivoted from its first to its second position to sandwich said one planar member between said one leaf and said adjacent leaf; and coacting means on adjacent leaves operative to maintain the adjacent leaves in spaced relation with the leaves in their second position so as to provide a cocoon therebetween to protectively receive a planar member.

10. An apparatus according to claim 9 wherein said leaves are positioned in spaced relation along said surface substantially from end structure to end structure and said plane for each leaf is substantially normal to said surface so that the left nearest one end structure is supported by said one end structure with that leaf pivoted to its first position and the leaf nearest the other end structure is supported by said other end structure with that leaf pivoted to its second position.

11. An apparatus according to claim 10 wherein said rack surface comprises a floor surface of said rack, said end structures extend vertically upwardly at opposite ends of said floor surface, and said leaves are pivoted at their lower edges to said floor surface.

12. An apparatus according to claim 9 wherein each leaf is formed of a plastic material and includes a main body portion and live hinge along one edge of said main body portion formed integrally with said main body portion.

13. An apparatus for handling and transporting planar members, said apparatus comprising:

a rack including spaced end structures and means to facilitate transport of said rack between spaced locations;

a plurality of leaves positioned in serial relation along a surface of said rack extending between said end structures with each leaf hinged at one edge thereof to said surface in generally parallel spaced relation to the hinge axes of the adjacent leaves and with each leaf pivotal between a first position on one side of a reference plane passing through the hinge axis of that leaf and a second position on the other side of said plane so that one of said leaves may be pivoted from its first to its second position, one of said planar members may be positioned adjacent said one leaf, and the next adjacent leaf may be pivoted from its first to its second position to sandwich said one planar member between said one leaf and said adjacent leaf;

said leaves being positioned in spaced relation along said surface substantially from end structure to end structure and said plane for each leaf being substantially normal to said surface so that the leaf nearest one end structure is supported by said one end structure with that leaf pivoted to its first position and the leaf nearest the other end structure is supported by said other end structure with that leaf pivoted to its second position;

each of said leaves including a main body generally planar portion having a size and configuration conforming to the size and configuration of said planar members and edge portions along opposite sides of said main body portion, including internestable structure;

said internestable structure on the edge portions of adjacent leaves being operative to internest with the leaves in said reference plane and being operative to assume a stacked relative disposition as the leaves move away from said reference plane.

14. An apparatus according to claim 13 wherein each edge portion defines a polarity of spaced male configurations on one side of the leaf and a corresponding plurality of spaced female configurations on the other side of the leaf.

15. An apparatus for handling and transporting sheet metal stampings, said apparatus comprising:

a rack including a base structure defining a floor surface, upstanding end structures at each end of said base structure, and means to facilitate transport of said rack between spaced locations; and a plurality of generally planar, generally rectangular leaves positioned in serial relation along said floor surface from a location proximate one end structure to a location proximate the other end structure with each leaf including a hinge structure along its lower edge defining a hinge axis extending generally normal to the longitudinal axis of said rack and with each leaf being pivotally movable between a first position on one side of a plane generally normal to said floor surface and passing through the hinge axis of that leaf and a second position on the other side of said plane;

the leaf nearest one of said end structures being spaced longitudinally from said one end structure by a distance to allow that leaf to assume a pivoted position on one side of the respective plane in which the upper end of that leaf is supported by said one end structure;

the leaf nearest the other end structure being spaced longitudinally from said other end structure a distance to allow that leaf to assume a pivoted position on the other side of its respective plane in which the upper end of that leaf is supported by said other end structure; and said rack being open along one side thereof between said end structures to allow stampings to be inserted between adjacent leaves from said open side of said rack.

16. An apparatus according to claim 15 wherein each leaf is formed of a plastic material and includes a generally planar main body portion shaped to conform to the shape of said stampings and vertical edge portions on either side of said main body portion and wherein said edge portions include internestable structure and wherein said internestable structure on the edge portions of adjacent leaves are operative to internest with said leaves in said normal plane and are operative to stack as the leaves move away from said normal plane.

17. An apparatus according to claim 15 wherein each leaf comprises a molded plastic member with said hinge structure comprising a live hinge formed integrally with the main body portion of the leaf.

18. An apparatus according to claim 15 wherein said transport facilitating means comprises tunnels defined in said base structure for receipt of the forks of a forklift truck.

* * * * *